April 6, 1937.  E. J. FRASER  2,076,020
TRAILER LIGHT
Filed July 18, 1936
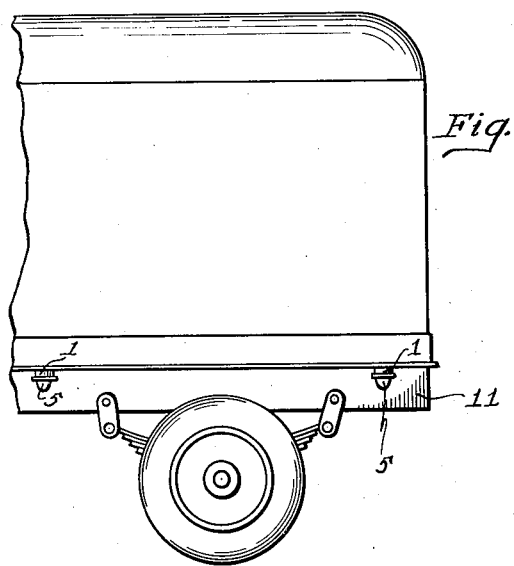
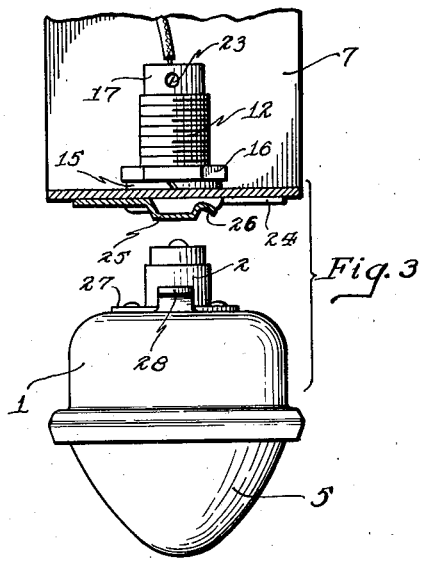
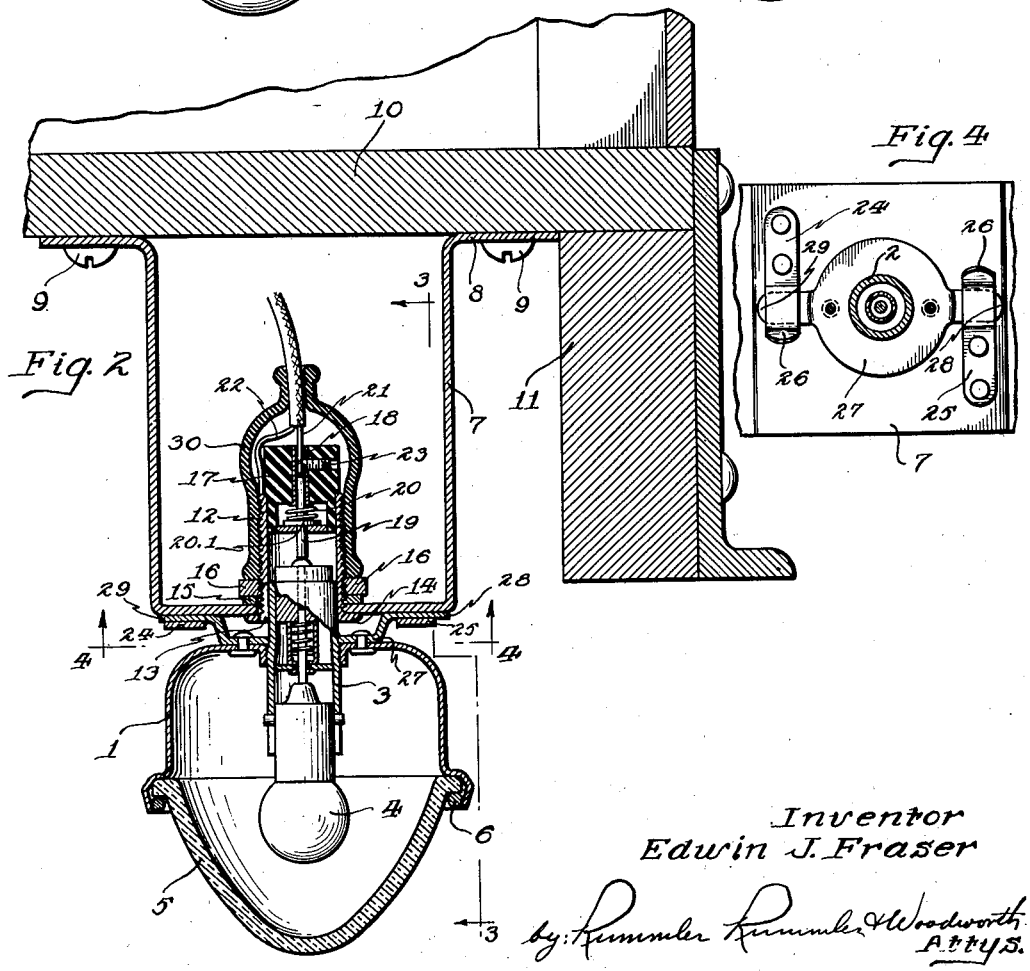
Inventor
Edwin J. Fraser
by Rummler Rummler & Woodworth
Attys.

Patented Apr. 6, 1937

2,076,020

UNITED STATES PATENT OFFICE 2,076,020

TRAILER LIGHT

Edwin J. Fraser, Chicago, Ill., assignor to Keeshin Motor Express Co. Inc., Chicago, Ill., a corporation of Illinois Application July 18, 1936, Serial No. 91,286

2 Claims. (Cl. 240—7.1)

This invention relates to improvements in trailer riding lights and particularly to simplified, easily renewable, light units of the nature of those disclosed in my copending applications Serial No. 66,403, filed February 29, 1936 and Serial No. 73,321, filed April 8, 1936.

The main objects of the present invention are to provide a more simplified form and arrangement of trailer light; to provide a unitary trailer light construction capable of severe usage; to provide an improved trailer light of the class described which is removable and readily replaceable; to provide, as an article of manufacture, a new and improved trailer riding light unit which is arranged to be detachably secured to the trailer body; to provide an improved trailer light which may be readily adapted and secured to trailers now in use; and to provide an improved trailer riding light which is simple in construction and operation and inexpensive to manufacture.

An illustrative embodiment of this invention is shown in the accompanying drawing, in which:

Figure 1 is a fragmentary side view of the rear end of a trailer showing the trailer lights in position.

Fig. 2 is a cross sectional view of an improved lighting unit showing the device and its receptacle attached to a trailer body and in operating position.

Fig. 3 is a sectional view of the device taken on the line 3—3 of Fig. 2 but showing the lighting unit detached from the receptacle, and Fig. 4 is a cross sectional view taken on the line 4—4 of Fig. 2.

Heretofore the riding lights on trailers were generally set, or built, directly into the trailer body and were therefore difficult to dismantle for insertion of new bulbs, or repair, upon their being broken or smashed, so that the problem of maintenance had become a serious expense.

These riding lights were also difficult to repair or replace when on the road as the trailer body was usually broken or dented when an accident occurred, so that it was often necessary to continue without proper lighting, in direct violation of the state laws, and without sufficient light protection for the trailer itself. Furthermore most of the trailers as manufactured are only provided with two riding lights located at the rear and one located on the port side at the forward end so that in order to comply with the various laws of the several states it is necessary for the purchaser to install additional lights according to the states in which the trailer is to be operated. Also, if the trailer is to be operated in several states, the maximum number of lights must be provided which results in an unnecessary expense and battery drain when the vehicle is being operated in states where a lesser number of lights is required.

In the form shown in the drawing, my improved trailer light is constructed as a unitary device comprising a housing or casing 1 having an integral cylindrical base 2 disposed centrally on the closed end of the casing 1 and projecting therefrom, a lamp socket 3 housed within the casing 1 and secured centrally on the closed end thereof, a lamp 4 and a bowl shaped lens 5 detachably secured at the open end of the casing 1 by means of a split ring fastener 6 seated in an annular groove surrounding the margin of the casing 1. A metallic collar 27 is arranged to slip over the base 2 and be secured to the outer face of the closed end of the casing 1, and is provided with a pair of wings 28 and 29 integrally formed on the collar 27.

A receptacle socket for the lighting unit is mounted on a U-shaped channel bracket 7 having flanged ends 8 which are provided with apertures through which screws 9 are arranged to be inserted to secure the bracket to the underside of the floor boards 10 of the trailer adjacent the side frames 11.

The receptacle socket is externally threaded as at 12 and is provided with a bayonet slot 13 at its open end. The open end of the socket is provided with a flange 14 which is arranged to seat on the lower face end of the U-bracket and a lock-washer 15 and lock nut 16 are arranged to clamp or secure the socket to the U-bracket 7. The socket is also provided with an insulated cylindrical member 17 having a contact sleeve 18 centrally positioned therein and in which a contact member 19 is slidably mounted. The contact member 19 is normally urged outwardly toward the open end of the socket by means of a helical compression spring 20 which, at one end engages a collar 20.1 secured on the member 19 and at the other end engages the end face of the member 17. Current, the source of which is usually a battery, not shown, is supplied to the socket by means of lead wires 21—22. The wire 21 is connected directly to the contact sleeve 18 by means of a set screw 23, and leads to the current source or battery. The wire 22 is grounded. An insulating cap 30 which may be of rubber is arranged to completely envelop the external exposed parts of the receptacle socket to protect the various parts from the elements of the weather.

The outer bottom face of the U-bracket member is also provided with a pair of opposed spring clips 24 and 25, one end of each being adequately secured thereon. The other end of each clip is bent upwardly in dish-form and then provided with an upturned lip 26.

The lighting unit is arranged to be detachably secured to the receptacle socket by inserting the base 2 therein to its limit of vertical movement and is locked in position by turning the casing clockwise in a manner that the wings 28 and 29 will be engaged by the clips 24 and 25 and held in such an interlocked position by the dished portions of the clips.

It will be apparent from this disclosure that the outward thrust action of the contact rod 19 will assist in forcibly maintaining the wings 28 and 29 in the clips 24 and 25 and prevent displacement of the lighting unit through vibration or inadvertent handling.

To remove the lighting unit it is merely necessary to press the unit toward the receptacle socket and turn it counter-clockwise to free the wings 28 and 29 from the clips 24 and 25. The unit may then be pulled directly away from the socket.

A further feature of the arrangement herein disclosed is that in the event a lighting unit is lost or stolen and the driver of the vehicle is without spare units, an ordinary lamp may be inserted in the receptacle socket in the usual way and temporarily serve to answer the function of the lighting unit until a new lighting unit can be secured.

It will be readily seen that the present invention completely cures the defects and shortcomings of the usual trailer lighting devices and systems. Also when using my devices, the vehicle driver may readily and quickly remove the lighting units from the receptacles when he arrives at a terminal, thus preventing thefts thereof. Further, each trailer may be provided with spare lighting units in its tool kit, so that in the event of breakage or pilferage while on the road, a new lighting unit can readily be placed in operation; and, when the trailer is returned to the garage after a run, the mechanic during his routine inspection can readily test and check each lighting unit to make sure that the trailer is carrying the maximum legal complement of serviceable units as well as a proper number of spares.

Although but one specific embodiment of this invention has been herein shown and described, it will be understood that details of the construction shown may be altered or omitted without departing from the spirit of this invention as defined by the following claims:

I claim:

1. A trailer light of the class described comprising a bracket, a socket mounted therein, said socket being connected to a source of current and said bracket being mounted under the floor boards and adjacent the edge of a trailer body, the exposed face end of said socket being arranged to lie in a plane substantially flush with the lower exposed edge of the side frame member of the trailer body, a pair of opposed clips mounted on said bracket, and a detachable lighting unit comprising a casing having a centrally disposed protruding base integral with said casing, arranged to be inserted in said socket, and a pair of opposed wings secured to said casing and arranged to interlockingly engage said clips when said lighting unit is inserted in said socket and turned angularly.

2. A trailer light of the class described comprising a U-shaped channel bracket arranged to be mounted under the floor boards and adjacent the edge of a trailer body, the exposed face end of said socket being arranged to lie in a plane substantially flush with the lower exposed edge of the side frame member of the trailer body, a socket mounted in and to said channel bracket, said socket being connected to a source of current, a shiftable contact member mounted within said socket, a compression spring arranged to normally urge said contact member toward the entrance of said socket, and a pair of opposed clips mounted on the closed end of said channel bracket, and a detachable lighting unit comprising a casing having a centrally disposed protruding base integral with said casing, a pair of opposed wings secured to said casing and arranged to interlockingly engage said clips when said base is inserted in said socket and turned angularly, and said contact member arranged to normally urge said wings against said clips.

EDWIN J. FRASER.